United States Patent
Delia et al.

(10) Patent No.: US 9,740,795 B2
(45) Date of Patent: Aug. 22, 2017

(54) METHODS, SYSTEMS, AND COMPUTER PROGRAM PRODUCTS FOR CONSOLIDATING WEB PAGES DISPLAYED IN MULTIPLE BROWSERS

(75) Inventors: David J. Delia, Lagrangeville, NY (US); Wayne M. Delia, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2730 days.

(21) Appl. No.: 11/684,748

(22) Filed: Mar. 12, 2007

(65) Prior Publication Data

US 2008/0229231 A1  Sep. 18, 2008

(51) Int. Cl.
| | | |
|---|---|---|
| G06F 17/30 | (2006.01) | |
| G06F 17/00 | (2006.01) | |
| G06F 17/20 | (2006.01) | |
| G06F 17/21 | (2006.01) | |
| G06F 17/22 | (2006.01) | |
| G06F 17/24 | (2006.01) | |
| G06F 17/25 | (2006.01) | |
| G06F 17/26 | (2006.01) | |
| G06F 17/27 | (2006.01) | |
| G06F 17/28 | (2006.01) | |

(52) U.S. Cl.
CPC .............................. *G06F 17/30905* (2013.01)

(58) Field of Classification Search
CPC ......... G06F 17/30905; G06F 17/30174; G06F 17/30578
USPC .......... 715/206, 781; 707/E17.121, E17.119, 707/E17.112
See application file for complete search history.

(56) References Cited

U.S. PATENT DOCUMENTS

| | | | |
|---|---|---|---|
| 6,018,342 A * | 1/2000 | Bristor .......................... | 715/840 |
| 6,034,689 A * | 3/2000 | White et al. .................. | 715/854 |
| 6,801,227 B2 | 10/2004 | Bocionek et al. | |
| 2006/0004785 A1* | 1/2006 | Hinegardner et al. ........ | 707/100 |
| 2006/0155728 A1 | 7/2006 | Bosarge | |
| 2006/0161859 A1* | 7/2006 | Holecek et al. .............. | 715/781 |
| 2006/0184537 A1 | 8/2006 | Sauve et al. | |
| 2006/0271858 A1* | 11/2006 | Yolleck et al. ............... | 715/738 |
| 2007/0283011 A1* | 12/2007 | Rakowski et al. ............ | 709/225 |
| 2008/0209338 A1* | 8/2008 | Li ................................. | 715/745 |

* cited by examiner

*Primary Examiner* — Manglesh M Patel
*Assistant Examiner* — Nicholas Hasty
(74) *Attorney, Agent, or Firm* — Cantor Colburn LLP

(57) ABSTRACT

Methods, systems, and computer program products for consolidating Web pages displayed in multiple browsers at a computer processing device are provided. A method includes generating an information file in response to initiation of a browser instance and creating a file record for each web page accessed during the browser instance. The file record includes session history data for each web page. The method also includes consolidating each of the file records from the information file with other file records from another information file created in response to another browser instance. The method further includes displaying a single view of browser activity corresponding to the browser instance and the other browser instance resulting from the consolidation.

9 Claims, 8 Drawing Sheets

METHODS, SYSTEMS, AND COMPUTER PROGRAM PRODUCTS FOR CONSOLIDATING WEB PAGES DISPLAYED IN MULTIPLE BROWSERS

BACKGROUND OF THE INVENTION

The present disclosure relates generally to Web browsers and, in particular, to methods, systems, and computer program products for consolidating Web pages displayed in multiple browsers.

The World Wide Web (WWW), or "Web," has become a well-known and versatile feature of the Internet. The Web comprises many files or pages of information, distributed across many different servers. Each page is identified by an individual address or "Universal Resource Locator (URL)" which, in turn, denotes both a server machine and a particular file or page on that machine. There may be many pages or URLs resident on a single server.

Typically, to utilize the Web, a user runs a computer program called a Web browser ("browser") on a client computer system such as a personal computer. The user interacts with the browser to select a particular URL. The interaction causes the browser to send a request for the URL-identified page or file to the URL-identified server. Typically, the server responds to the request by retrieving the requested page and transmitting the data back to the requesting client utilizing hypertext transfer protocol (HTTP), a well known protocol in the art. The page received by the client is displayed to the user on the client machine. The client may also cause the server to launch an application, such as a search engine, to search for Web pages relating to particular topics.

Many Web pages also contain one or more references to other Web pages, which need not reside on the same server as the original page. Such references may be activated by selecting particular locations on the screen, e.g., clicking a mouse control button. These references or locations are known as hyperlinks, and are typically flagged by the browser in a particular manner such as through the use of color coding the text link. If a user selects the hyperlinked text, then the referenced page is retrieved and replaces the currently displayed page.

Newer browser technology has extended the traditional technology of requesting and receiving Web pages to include more advanced features. For example, the concept of "tabbed browsing" enables the management and display of multiple Web pages in a single instance of a Web browser. Several different instances of browsers in separate windows, whether the same browser product or different browsers, tend to clutter the desktop by increasing the number of open windows to be managed, and further prevent the convenient interaction of different Web pages within a single window which has made the concept of tabbed sections so popular. Multiple instances of separate Web browsers also increase the demand on system random access memory (RAM) where a single instance with multiple tabbed sections would require less system memory.

The ability to spawn separate instances of browsers often results in multiple instances of browsers displaying one or more Web pages in tabs. A typical computer workstation session might feature three instances of a browser, one of which contains five Web pages displayed in five tabbed windows, while the other two instances of the browser each display a single Web page. Meanwhile, one or more instances of another browser application could also be open, each displaying a single Web page. Additionally, each individual browser window displaying a Web page may contain information on the browsing history of Web pages previously browsed within that stand-alone window or tabbed window. Clearly, managing multiple browser instances and corresponding open Web pages can be a difficult task.

What is needed, therefore, is a way to consolidate multiple Web pages viewed in different instances of one or more different browsers into tabbed viewing in a single instance of a single Web browser.

BRIEF SUMMARY OF THE INVENTION

Embodiments of the invention include methods for consolidating Web pages displayed in multiple browsers at a computer processing device. A method includes generating an information file in response to initiation of a browser instance and creating a file record for each web page accessed during the browser instance. The file record includes session history data for each web page. The method also includes consolidating each of the file records from the information file with other file records from another information file created in response to another browser instance. The method further includes displaying a single view of browser activity corresponding to the browser instance and the other browser instance resulting from the consolidation.

Additional embodiments include systems for consolidating Web pages displayed in multiple browsers. A system includes a computer processing device and a consolidation browser executing on the computer processing device. The consolidation browser performs a method. The method includes generating an information file in response to initiation of a browser instance and creating a file record for each web page accessed during the browser instance. The file record includes session history data for each web page. The method also includes consolidating each of the file records from the information file with other file records from another information file created in response to another browser instance. The method further includes displaying a single view of browser activity corresponding to the browser instance and the other browser instance resulting from the consolidation.

Further embodiments include computer program products for consolidating Web pages displayed in multiple browsers. A computer program product includes instructions for causing a computer to implement a method. The method includes generating an information file in response to initiation of a browser instance and creating a file record for each web page accessed during the browser instance. The file record includes at least one of a tab sequence identifier, a load order sequence identifier, and a uniform resource locator of each web page. The method also includes consolidating each of the file records from the information file with other file records from another information file created in response to another browser instance. The method further includes displaying a single view of browser activity corresponding to the browser instance and the other browser instance resulting from the consolidation.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments of the invention consolidate multiple Web pages viewed in different instances of one or more different browsers into tabbed viewing within a single instance of a single Web browser. A consolidation browser captures session history details relating to browser activities and generates information files for use in the consolidation. Upon selection of a browser instance and activation of the consolidation features of the consolidation browser, information files including session history data are replicated in newly created tabbed sections of the selected browser and corresponding Web pages are displayed as a single browser instance.

Figure 1:
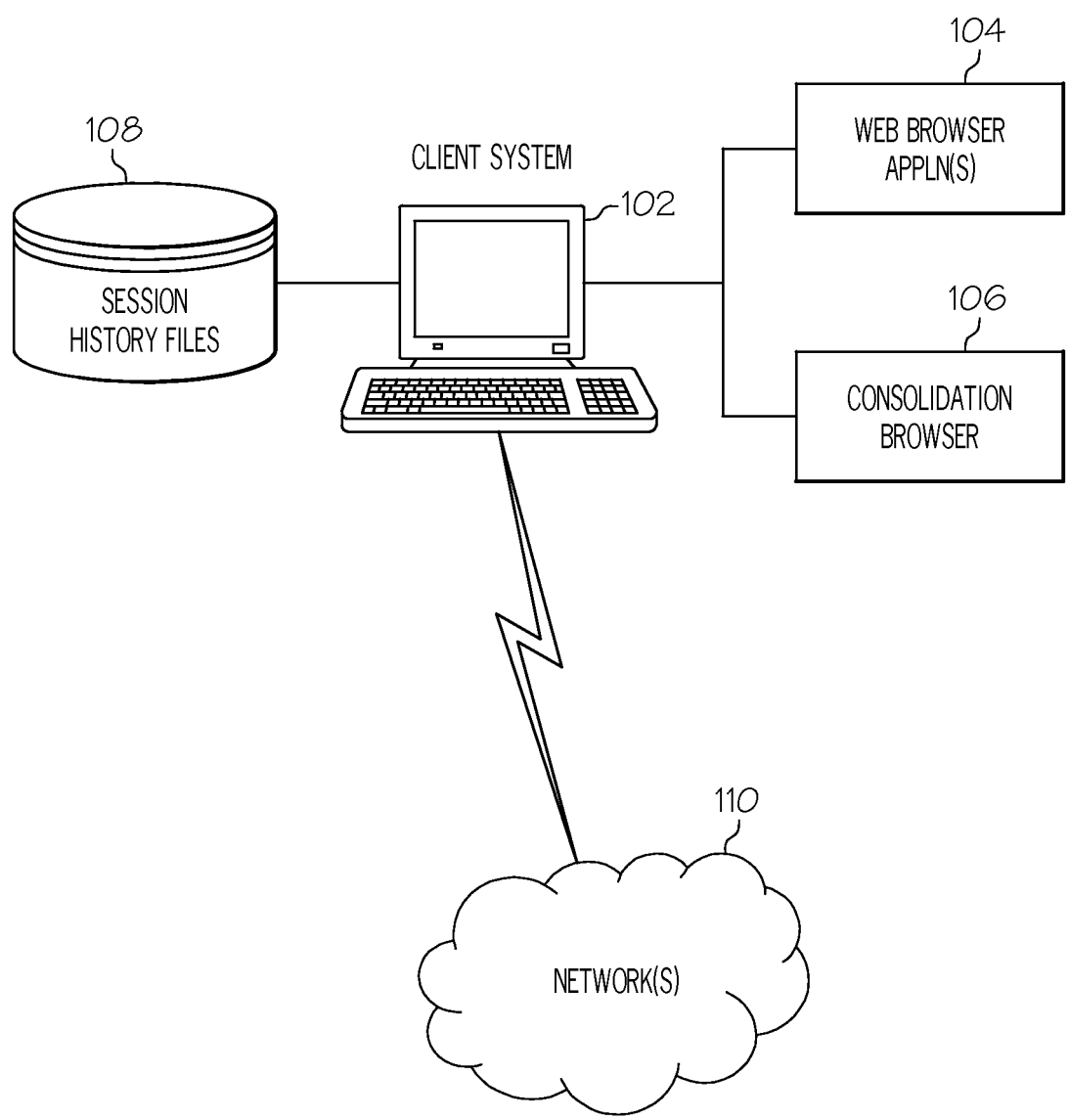
FIG. 1 is block diagram of a system upon which Web page consolidation may be implemented in exemplary embodiments.

Turning now to FIG. 1, a system upon which the Web page consolidation activities may be implemented will now be described in accordance with exemplary embodiments. The system includes a client system 102 in communication with one or more networks 110 via an Internet service provider (not shown). The client system 102 may be implemented by a general-purpose computer processing device (e.g., desktop, laptop, etc.), or may be a wireless portable computer device (e.g., a personal digital assistant). The client system 102 executes one or more Web browser applications 104 for requesting Web pages over networks 110. For example, Web browser applications 104 may include Microsoft® Internet Explorer, Mozilla® Firefox, Netscape® Navigator, etc. Client system 102 also executes a consolidation browser 106 for implementing the Web page consolidation functions described herein. The consolidation browser 106 may be, e.g., a plug-in application that communicates with Web browser applications 104. In alternative exemplary embodiments, consolidation browser 106 and one or more Web browser applications 104 may be implemented as a single application.

Client system 102 also includes a storage component 108 (e.g., internal or external memory). It is understood that the storage component 108 may be implemented using memory contained in the client system 102 or that it may be a separate physical device. Information stored in the storage component 108 may be retrieved and manipulated via the client system 102. The storage component stores session history files created and used by the consolidation browser 106.

Networks 110 may include any type of known network including, but not limited to, a wide area network (WAN), a local area network (LAN), a global network (e.g. Internet), a virtual private network (VPN), and an intranet. The networks 110 may be implemented using a wireless network or any kind of physical network implementation known in the art.

Figure 2:
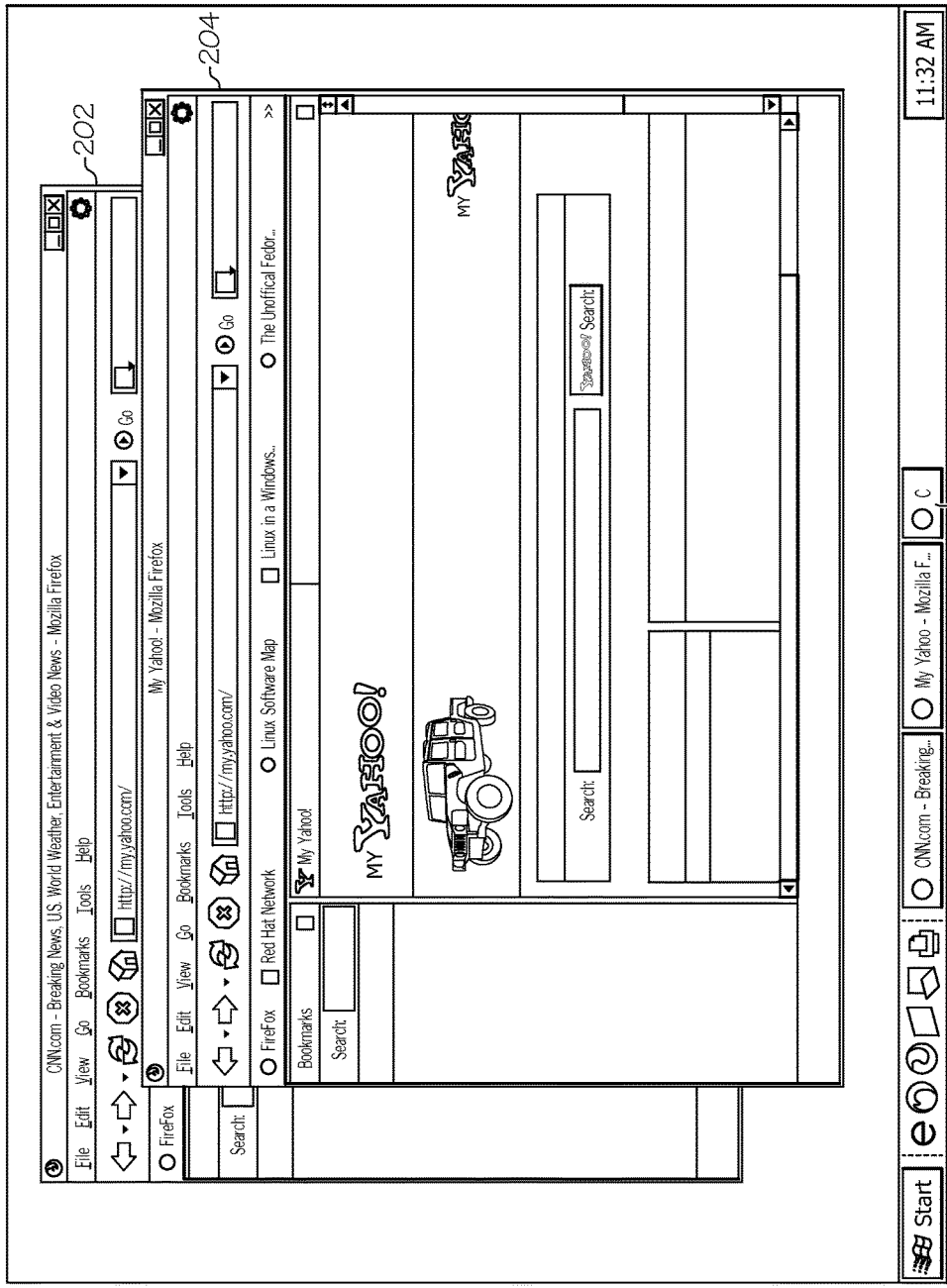
FIG. 2 is a computer screen displaying Web pages accessed by one or more Web browsers in exemplary embodiments.

FIG. 2 illustrates a computer screen 200 (i.e., desktop screen) that may be displayed on client system 102 in response to initiating Web browser application 104 and accessing one or more Web sites. The computer screen window 200 illustrates two running instances of a Mozilla® Firefox browser. The two running instances are represented as a Web page 202 accessed from CNN.com®, and a Web page 204 accessed from Yahoo.com®. The highlighted instance, i.e., Web page 204, displays a single Web page in a single tab (http://my.yahoo.com). An activation element, or icon 206, for initiating the consolidation browser 106 is also shown in the computer screen window 200. This icon 206 will be described further herein.

Figure 3:
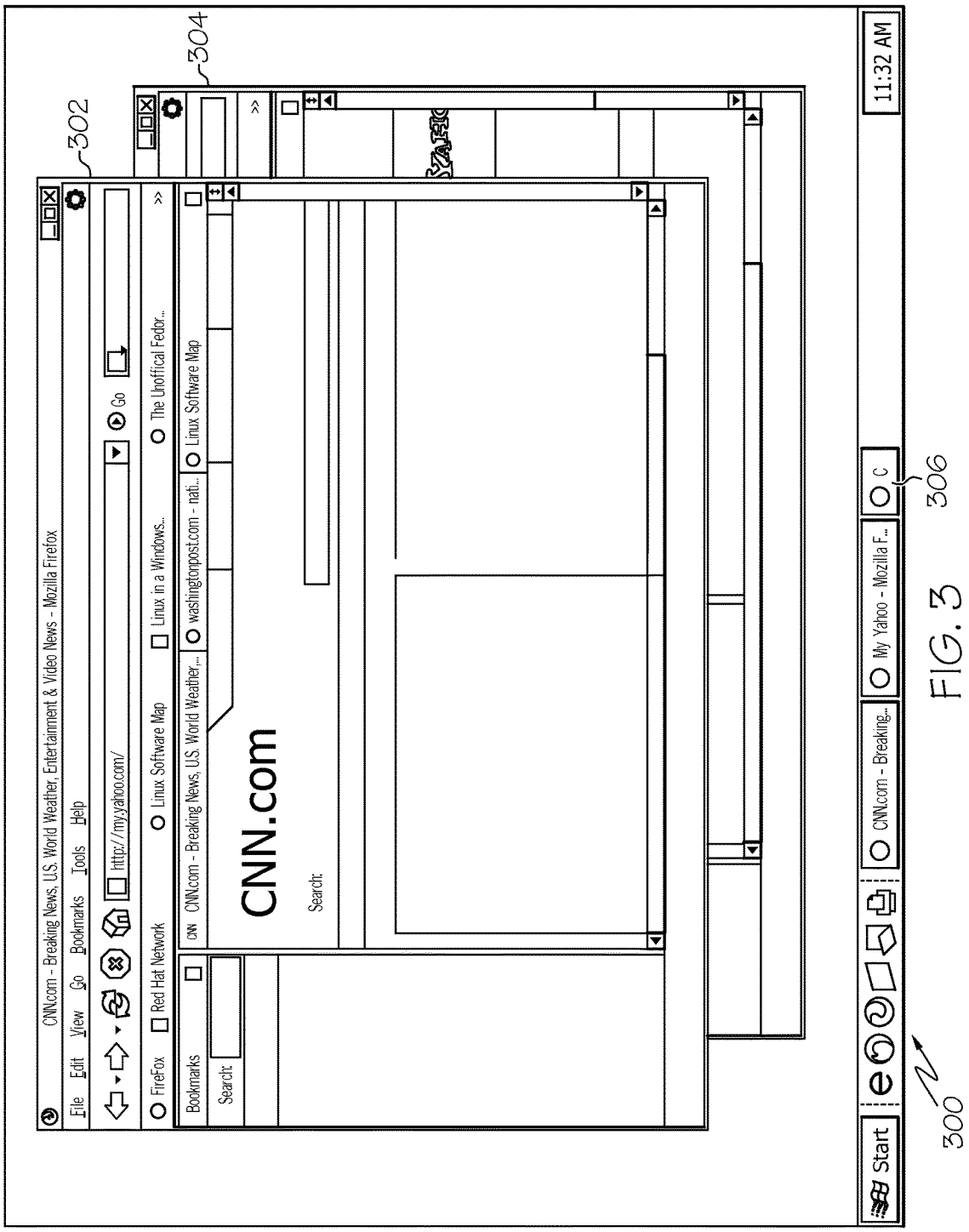
FIG. 3 is a computer screen displaying additional Web pages accessed by one or more Web browsers in exemplary embodiments.

FIG. 3 illustrates a computer screen 300 displayed on client system 102 which represents the second instance of the browser and includes three tabbed sections. The currently displayed Web page is http://www.cnn.com, which was loaded first. The second and third tabbed sections are, respectively, http://washingtonpost.com and http://www.boutell.com/lsm, loaded in that sequence. An activation element, or icon 306, for initiating the consolidation browser 106 is also shown in the computer screen window 300. This icon 306 is functionally similar to that shown in FIG. 2 as described further herein.

The consolidation browser 106 detects instances of Web browsers active on a computer system (e.g., client system 102) and makes information available (e.g., the URL of the Web page current being displayed, and the history list of URLs of previously viewed Web pages) between Web browsers (e.g., Web browser applications 104). The activation element 206 or 306 on a single browser window gathers the information about current and previous activity of all other browser instances and opens up a single instance of a browser capable of support tabbed windows. The history of Web pages viewed in other browsers is transferred to the corresponding tabbed section of the consolidated browser. Once the consolidation of displayed Web pages is completed, all other instances of browsers are terminated.

Figure 4:
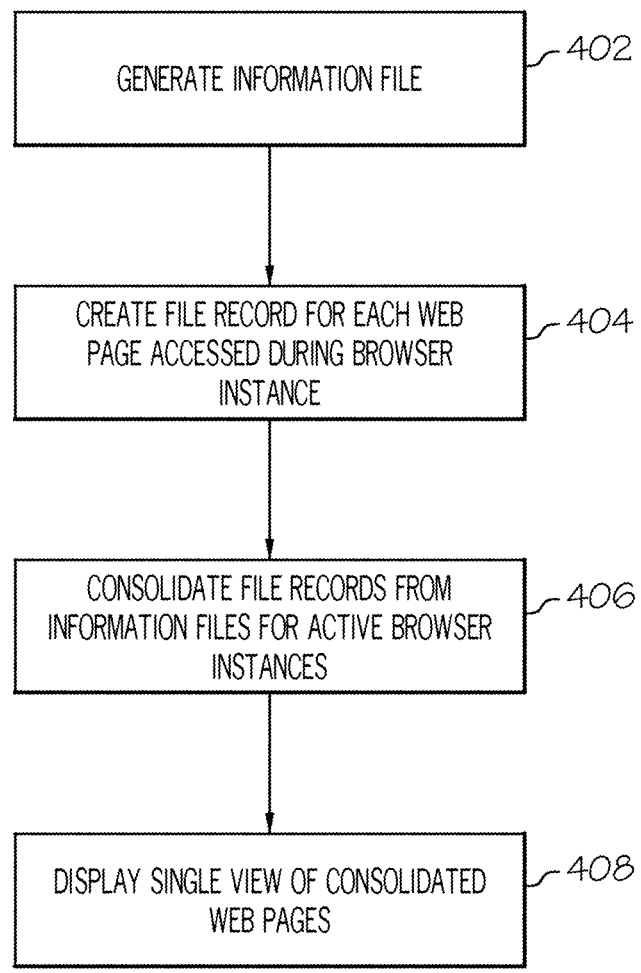
FIG. 4 is a flow diagram describing a process for implementing Web page consolidation in exemplary embodiments.
Figure 5:
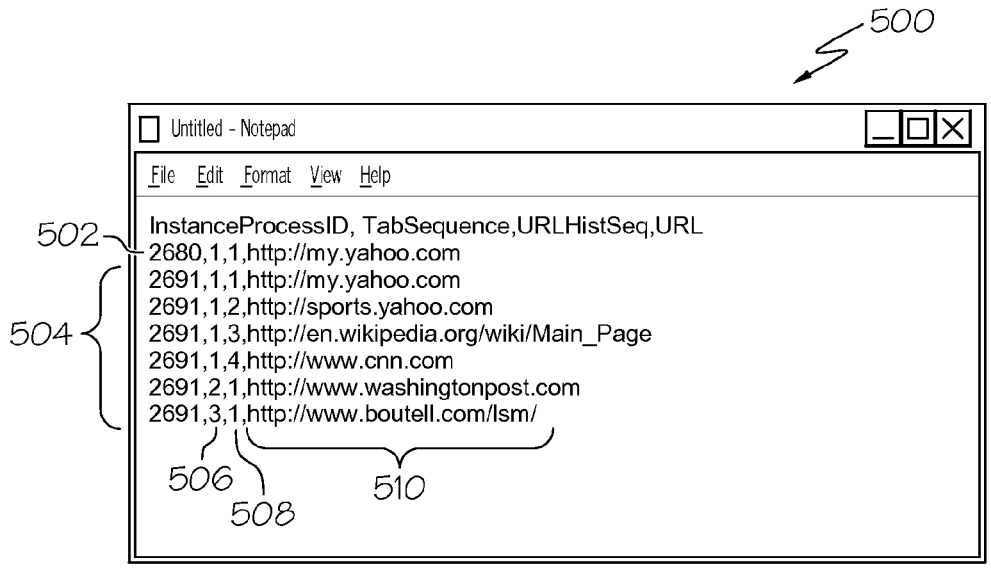
FIG. 5 depicts a history file illustrating information files and records generated and used by the Web page consolidation in exemplary embodiments.

Turning now to FIG. 4, a flow diagram illustrating a process for implementing Web page consolidation will now be described in exemplary embodiments. The consolidation browser 106 creates a history file including information files for use in implementing the activities as described herein. The history file may be stored in memory at the client system 102. At step 402, an information file is created in response to initiation of a Web browser application 104 from a user at client system 102. Each information file corresponds to a browser instance. A browser instance is one in which a user at a computer system (e.g., client system 102) activates a web browser application (e.g., application 104) by selecting, e.g., a corresponding icon on the system task bar, whereby a main browser page is displayed and the user accesses at least one Web page from that browser page. When the user selects the browser icon a second time, a second main page is displayed, which creates a new browser instance. It will be understood that the two instances may simultaneously co-exist on the system desktop. A file record is created for each Web page accessed during the browser instance at step 404. A history file 500 including two sample information files 502 and 504 for two separate browser instances is shown in FIG. 5. The record and information file processes of steps 402 and 404, and the history file 500 of FIG. 5, are further described in the flow diagram of FIG. 6.

Upon a request from the user of client system 102, the file records from the information files generated in steps 402 and 404 are consolidated at step 406. The consolidation process of step 406 is further described in the flow diagram of FIG. 7, in conjunction with the history file 500 of FIG. 5, and the computer screen 800 of FIG. 8. At step 408, the consolidation browser 106 displays the Web pages, for which information files have been consolidated, as a single view (i.e., browser instance) on the client system 102.

Figure 6:
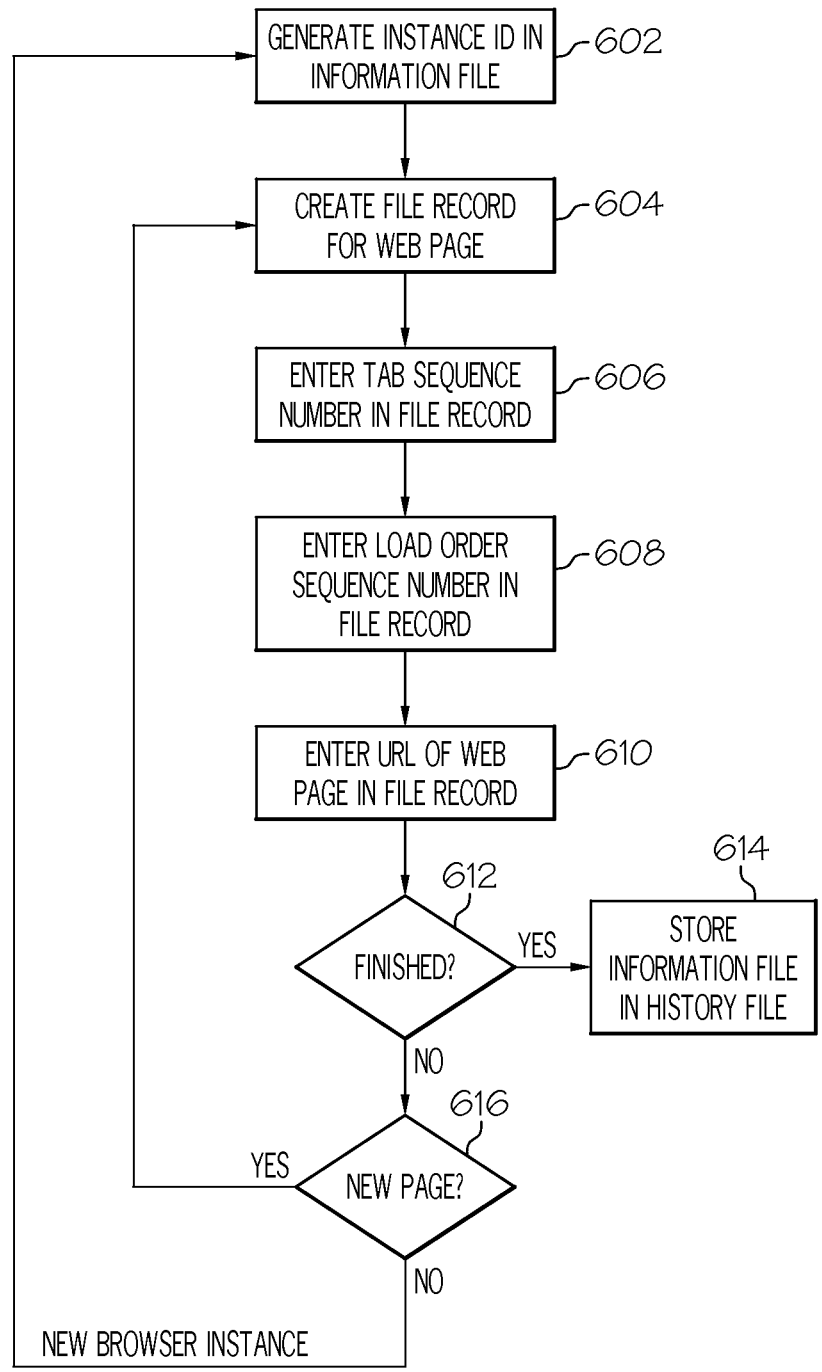
FIG. 6 is a flow diagram describing a process for creating a history file in exemplary embodiments.

Turning now to FIGS. 5 and 6, a history file and a process for creating and processing an information file for use by the consolidation browser 104 will now be described in exemplary embodiments. In addition, the history file 500 data corresponds to the browser activity shown in FIGS. 2 and 3. Accordingly, reference will be made herein to the computer screens 200 (for instance identifier 2680) and 300 (for instance identifier 2691) of FIGS. 2 and 3, respectively, as applicable.

Upon initiation of a browser instance by a user at client system 102, the consolidation browser 104 generates a browser instance identifier (also referred to herein as "instance identifier" and "InstanceProcessID") for an information file associated with the Web session at step 602. The instance identifier uniquely identifies each browser instance of the user at the client system 102. As shown in FIG. 5, there are two instance identifiers 502 (process ID 2680) and 504 (process ID 2691), each representing an information file and corresponding browser instance. It will be understood that multiple different browsers may be simultaneously active on the client system 102 desktop or a single browser may be active having multiple browser instances simultaneously active on the client system 102 desktop.

At step 604, a file record is created for each Web page accessed by the user in the browser instance. The file record may include (e.g., in XML or other data-transfer format) one more types of session history data including, e.g., the instance identifier, a tab sequence number 506, a load order sequence number 508 and the URL of the current or previously viewed Web page within a tabbed section identified by element 506.

At step 606, a tab sequence number is entered into the file record if supported by the browser application 104. The browser instance illustrated in FIG. 2 (which corresponds to instance identifier 2680 of FIG. 5) reflects a single tab, in which one Web page was loaded. The browser instance illustrated in FIG. 3 (which corresponds to instance identifier 2691) reflects 3 tabs (i.e., http://www.my.yahoo.com; http://www.washingtonpost.com; http://www.boutell.com/lsm).

At step 608, a load order sequence number is entered into the file record in response to each new Web page accessed. The load order sequence number reflects the order in which Web pages are loaded by the browser. The browser instance illustrated in FIG. 2 reflects a single page was loaded (element 508 of instance identifier 502). The browser instance illustrated in FIG. 3 reflects that four Web pages were loaded with respect to the first tab, and one page each was loaded with respect to the second and third tabs for instance identifier 2691.

The uniform resource locator of the Web page accessed is entered into the file record at step 610.

At step 612, it is determined whether the browser instance has completed. If so, the information file created in steps 602-610 is stored in a history file (e.g., history file 500 of FIG. 5) at step 614. Otherwise, it is determined whether a new page is accessed by the user for the browser instance at step 616. If so, the process returns to step 604 whereby a new file record is created that corresponds to the Web page. Otherwise, the user is initiating a new browser instance and the process returns to step 602 whereby a new instance identifier is created for a new information file corresponding to the new browser instance.

Figure 7:
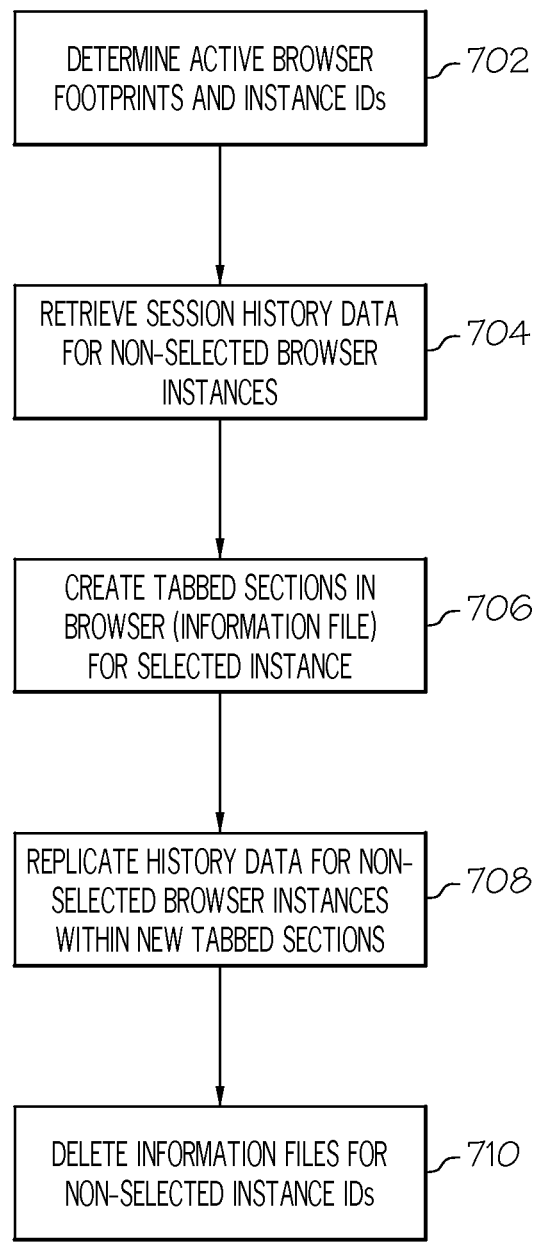
FIG. 7 is a flow diagram describing a process for consolidating information files in exemplary embodiments.

Turning now to FIG. 7, a process for consolidating Web pages into a single browser instance will now be described in exemplary embodiments. The consolidation process may be initiated by the user at the client system 102, e.g., by selecting the activation option or icon 206/306 from one of computer screens 200 and 300 of FIGS. 2 and 3, respectively. For purposes of illustration, it will be assumed that the user selected icon 206 corresponding to the instance identifier 2680.

Figure 8:
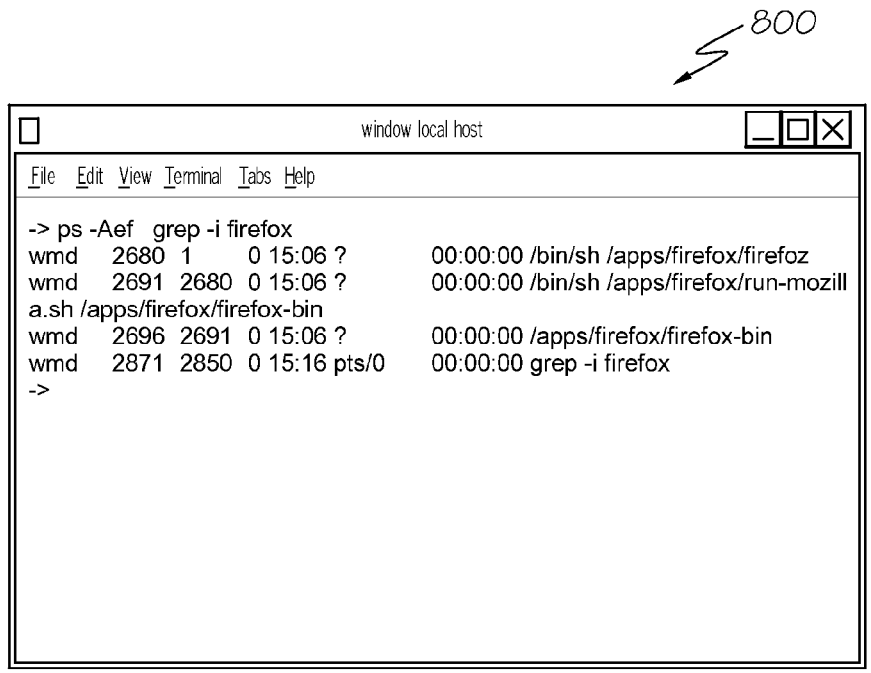
FIG. 8 is a computer screen window illustrating active browser processes used by the Web page consolidation in exemplary embodiments.

At step 702, the active browser footprints and instance identifiers are determined. The active browser footprints may be discovered, e.g., by analyzing running processes on the client system 102. A computer screen 800 illustrating the active browser instances corresponding to FIGS. 2 and 3 is shown in FIG. 8.

At step 704, session history data for the non-selected browser instances (e.g., using the above example, the non-selected browser instance is 2691) is retrieved from the corresponding information files. The consolidation browser 106 creates new tabbed sections using the retrieved session history data and presents the new tabbed sections in the browser corresponding to the selected browser instance (e.g., instance 2680) at step 706.

At step 708, the session history data for the non-selected browser instances is replicated within the new tabbed sections of the selected instance. Once the replication is complete, the information files for the non-selected instance identifiers (e.g., instance 2691) are deleted at step 710. The result is a single browser instance which includes all previously opened Web pages from two or more browsers. All other instances of the previously opened browsers are closed.

Figure 9:
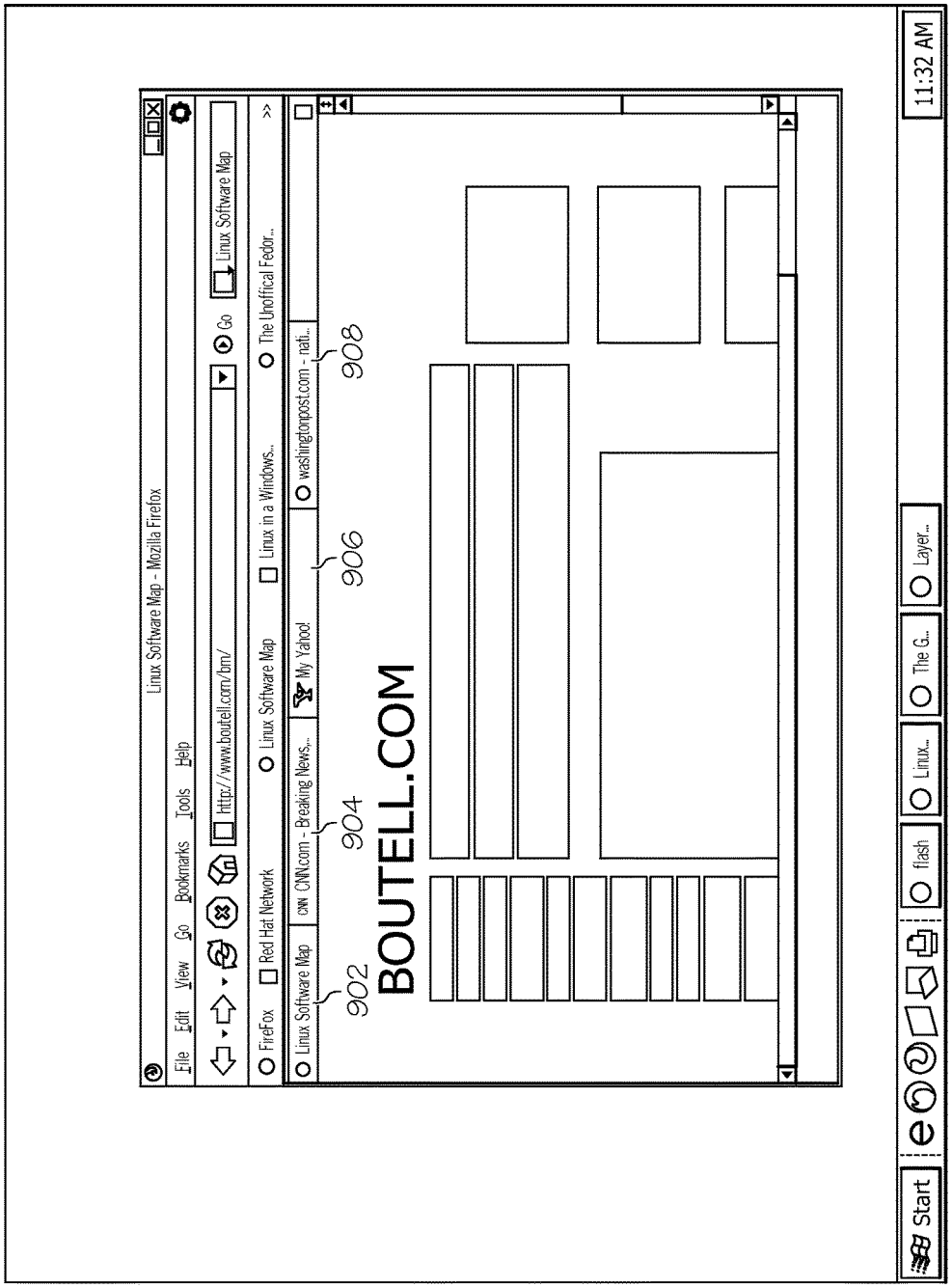
FIG. 9 is a computer screen illustrating a single browser instance consolidated from the browser instances shown in FIGS. 2 and 3 in accordance with exemplary embodiments.

An exemplary computer screen window illustrating a single browser instance resulting from the consolidation process described in FIG. 7 is shown generally in FIG. 9. A computer screen 900 includes tabbed sections 902-908 corresponding to two browser instances shown and described in FIGS. 2 and 3. It will be understood that multiple browser instances may be consolidated using the aforementioned processes and that the consolidation of only two instances is provided herein for ease of explanation and is not intended to be limiting in scope.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for consolidating Web pages displayed in multiple browsers at a computer processing device, comprising:
    generating first information file in response to initiation of a first browser instance executing on a client system, the first information file including a first browsing history of each web page presented by the first instance;
    generating a second information file in response to initiation of a second browser instance executing on the client system, the second information file including a second browsing history of each web page presented by the second instance; and
    during an active web browsing session:
    consolidating the first browser instance and the second browser instance together on the client system into a single instance where the first browser instance is contained in a first tab and the second browser instance is contained in a second tab;
    consolidating on the client system the first browsing history and the second browsing history to form a consolidated browsing history;
    selecting one of the first tab or the second tab;
    loading into the selected one of the tabs the consolidated browsing history; and
    displaying, in the selected tab the consolidated browsing.

2. The method of claim 1, further comprising:
    generating an instance identifier for the browser instance, the instance identifier uniquely identifying the browser instance and the information file.

3. The method of claim 2, wherein the session history data includes at least one of:
    a tab sequence identifier; and
    a load order sequence identifier specifying an order in which each Web page is loaded by a browser application associated with the browser instance.

4. The method of claim 1, wherein the browser instance and the other browser instance are initiated by a first browser application.

5. The method of claim 1, wherein the browser instance is initiated by a first browser application and the other browser instance is initiated by a second browser application.

6. A system for consolidating Web pages displayed in multiple browsers, comprising
    a computer processing device; and
    a consolidation browser executing on the computer processing device, the consolidation browser implementing a method, comprising:
    generating first information file in response to initiation of a first browser instance executing on a client system, the first information file including a first browsing history of each web page presented by the first instance;
    generating a second information file in response to initiation of a second browser instance executing on the client system, the second information file including a second browsing history of each web page presented by the second instance; and
    during an active web browsing session:
    consolidating the first browser instance and the second browser instance together on the client system into a single instance where the first browser instance is contained in a first tab and the second browser instance is contained in a second tab;
    consolidating on the client system each of the first browsing history and the second browsing history to form a consolidated browsing history;
    selecting one of the first tab or the second tab;
    loading into the selected one of the tabs the consolidated browsing history; and
    displaying, in the selected tab portions of the consolidated browsing history associated with the selected tab.

7. The system of claim 6, wherein the consolidation browser further implements:
    generating an instance identifier for the browser instance, the instance identifier uniquely identifying the browser instance and the information file.

8. The system of claim 7, wherein the session history data includes at least one of:
    a tab sequence identifier; and
    a load order sequence identifier specifying an order in which each Web page is loaded by a browser application associated with the browser instance.

9. The system of claim 6, wherein the browser instance and the other browser instance are initiated by a first browser application.

* * * * *